United States Patent [19]

Fink

[11] 3,899,873
[45] Aug. 19, 1975

[54] COUPLING LINK FOR CHAIN AND THE LIKE
[75] Inventor: Richard H. Fink, York, Pa.
[73] Assignee: Campbell Chain Company, York, Pa.
[22] Filed: Jan. 7, 1974
[21] Appl. No.: 431,214

[52] U.S. Cl. .................................... 59/85; 16/169
[51] Int. Cl. ............................................ F16g 13/06
[58] Field of Search .............. 59/85, 86, 87, 88, 89; 16/108, 169

[56] References Cited
UNITED STATES PATENTS

| 2,536,007 | 12/1950 | Milner | 16/169 X |
| 3,134,221 | 5/1964 | Bergman | 59/85 |
| 3,828,550 | 8/1974 | Fink | 59/85 |

FOREIGN PATENTS OR APPLICATIONS

| 731,881 | 4/1966 | Canada | 59/85 |
| 677,348 | 11/1964 | Italy | 16/169 |
| 517,483 | 2/1931 | Germany | 16/169 |
| 1,234,460 | 2/1967 | Germany | 59/85 |

Primary Examiner—Milton S. Mehr
Attorney, Agent, or Firm—Donnelly, Maky, Renner & Otto

[57] ABSTRACT

A coupling link includes a pair of U-shape half links having interdigitated ends with spaced-apart inner facing surfaces and aligned holes therethrough, the latter receiving a pin for hingedly connecting the half links. The pin has a pair of spaced-apart grooves located between the facing surfaces. Cylindrical spring means having an outer diameter greater than the diameters of the holes in the link ends is positioned on the pin between the facing surfaces and includes at its ends radially inwardly bent resilient fingers received in the pin grooves for holding the pin in a preselected axial position. A sleeve is press fit over the spring means for protective purposes and for providing a unitary assembly.

6 Claims, 1 Drawing Figure

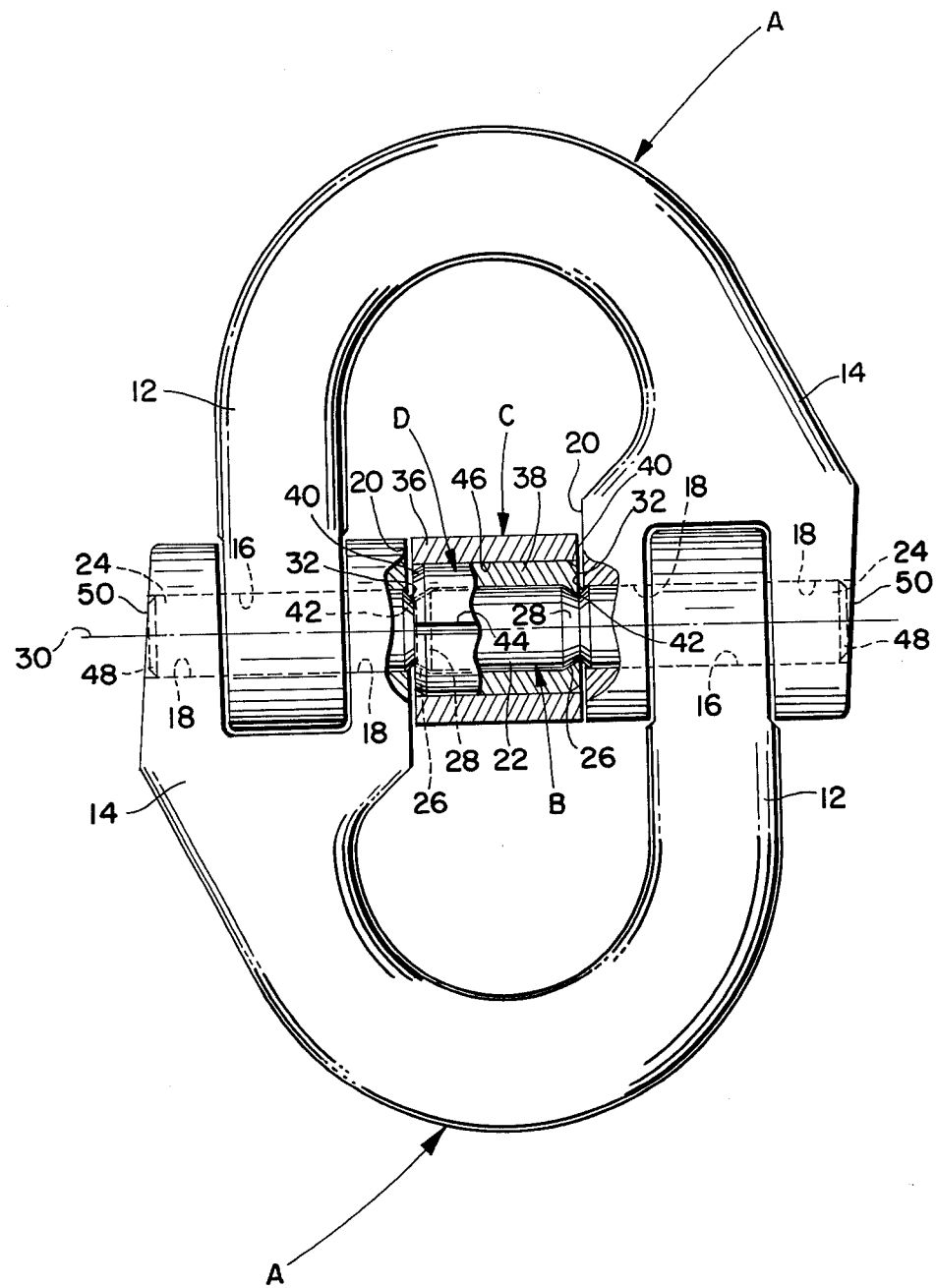

COUPLING LINK FOR CHAIN AND THE LIKE

BACKGROUND OF THE INVENTION

This application pertains to the art of coupling link assemblies and to retaining devices for use in such assemblies.

Chains and the like are often connected together by the use of a pair of substantially identical half links which include interdigitated ends having aligned holes therethrough and spaced-apart inner facing surfaces. A pivot pin extends through the holes and has a retaining device positioned thereon between the facing surfaces for holding the pin securely in place. Examples of such coupling link assemblies include the following U.S. Pat. Nos.: Adams 1,513,729, issued Nov. 4, 1924; Devonshire 2,972,223, issued Feb. 21, 1961; Bergman 3,134,221, issued May 26, 1964; Mason 3,241,309, issued Mar. 22, 1966; and Manney 3,373,560, issued Mar. 19, 1968.

The Adams retaining device uses rivets which extend through holes in a sleeve member and holes in the pin. Rivets require the use of special tools which are not always readily available at the site where the coupling half links must be interconnected. Furthermore, the rivets are unprotected and abrasion of their heads during extensive use can result in the rivet dropping out, so that the connecting pin can come free and the link thereby fail.

The Devonshire patent assembly requires a special pin having an enlarged central portion, making the pin expensive to manufacture. In addition, the holes through the interdigitated link ends must be large enough to accommodate the enlarged central portion of the pin so that a very sloppy connection results, the holes in the link ends necessarily having a diameter substantially larger than the diameter of the pin end portions. Devonshire further uses a deformable retaining device which yields beyond its elastic limit as the enlarged central portion of the pin is driven therein. Therefore, the interconnecting pin could quite readily be displaced from the retaining device in a direction opposite to that in which the pin was originally driven. Such pin displacement would again result in the link coupling being broken.

The Mason assembly also uses a pin having an enlarged central portion. Like Devonshire, this requires holes in the link ends which are of substantially larger diameter than the end portions of the pin. The retaining device in Mason includes a pair of generally C-shaped springs and a central sleeve, and this need for three separate pieces in the retaining device makes assembly difficult. In addition, only one spring in this device need be expanded to dislodge the pin.

The Bergman assembly includes a retaining device comprising a sleeve having a central internal groove carrying a C-shaped spring. Such a groove is extremely difficult to manufacture, and it is difficult to position such a generally C-shaped spring in the central groove. In contrast to the showing in Bergman, the groove in the sleeve must have a diameter substantially larger than the external diameter of the spring so that the spring can expand during driving movement of the pin and then contract when the pin groove is reached.

Manney and its parent application disclose a plurality of different retaining devices, all of which are formed from a plurality of separate parts, with only one embodiment providing a retaining device as a unitary assembly and using an elastomeric material for holding the individual components of the retaining device together in application to the coupling links. Elastomeric material quickly abrades away during use of the coupling link assembly and completely loses any further effectiveness.

It would be desirable to have a retaining device in the form of a unitary assembly which provides positive spring-type locking action of the pin in use, together with reliable protection for the spring in use of the coupled links.

SUMMARY OF THE INVENTION

A coupling link assembly of the type described includes an interconnecting pin having a pair of spaced-apart circumferential grooves therein between the facing surfaces of the link ends to be connected thereby. A generally cylindrical spring is positioned on and along the pin between such facing surfaces of the link ends and has at its respective ends resilient fingers received in the pin grooves.

In accordance with a preferred arrangement, a sleeve member is press fitted on the spring for protecting the same against abrasion, impact, or dislodgement during use of the coupling link assembly. The sleeve member in this case has a length substantially the same as the length of the spring.

In one arrangement, the spring is generally C-shaped by being longitudinally slit and is formed to define the resilient fingers at the end portions of the same.

It is a principal object of the present invention to provide an improved coupling link assembly.

Another object of the invention is to provide an improved unitary retaining device for use in such a coupling link assembly.

An additional object of the invention is to provide a coupling link assembly having an improved retaining device therein which provides spring locking action and which additionally has a relatively strong protective sleeve for preventing abrasion or other damage to the spring member.

A further object of the invention is to provide an improved spring-type of retaining or locking device for use in the noted coupling link assemblies.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

BRIEF DESCRIPTION OF THE DRAWING

The single FIGURE of the drawing shows a coupling link assembly constructed in accordance with the present invention, with portions cut away and in section for clarity of illustration.

DESCRIPTION OF A PREFERRED EMBODIMENT

Referring now to the drawing, wherein the showing is for purposes of illustrating a preferred embodiment of the invention only and not for purposes of limiting the same, a pair of substantially identical half links A, each having a single end 12 and a bifurcated clevis end 14, are reversely positioned with such ends being interdigitated as shown. Ends 12 and 14 have aligned circular holes 16 and 18, respectively, therethrough of substantially the same diameter for snugly receiving a generally cylindrical interconnecting pivot pin B.

Link ends 14 of the two interconnected half links A have spaced-apart opposite inner facing surfaces 20. Pin B includes a generally cylindrical central portion 22 having substantially the same diameter as the pin end portions 24. A pair of spaced-apart circumferential grooves 26 are formed in pin B closely adjacent these facing surfaces 20, with each groove 26 including an inner sloping surface 28 at an angle of around 30° to the longitudinal pin axis 30 and an outer sloping surface 32 at an angle of around 45° to such axis 30. Sloping surfaces 28 and 32 intersect at the bottom of grooves 26 and each intersection is located slightly inward from the adjacent facing surface 20. That is, the longitudinal distance between the intersections of sloping surfaces 28 and 32 of grooves 26 is slightly less than the longitudinal distance between facing surfaces 20.

A unitary retaining device C for holding pin B in such assembled position against axial dislodgement from the link holes 16 and 18 includes a spring member D and a seamless cylindrical metal protector sleeve 36 of relatively heavy gauge.

It will be recognized that spring means D may take many forms. In the preferred arrangement, it is formed as a fairly thick sleeve of spring steel having an elongated cylindrical central body portion 38 and radially inwardly crimped opposite end portions 40 which include terminal edges or ends 42. Spring D is longitudinally slit completely along its length at 44 so that the opposite crimped-in end portions 40 define resilient fingers which are deformable toward and away from the axis 30, with such deformation taking place within the elastic limit of the spring. The opposite ends of spring D substantially span the distance between facing link end surfaces 20 and sleeve 36 is substantially coextensive in length with spring D.

In making retaining device C, opposite end portions 40 may simply be crimped inwardly from a tubular member either before or after cutting of slit 44. Spring D may also be formed into a generally circular configuration from a flat strip of spring steel and slit 44 will exist by using a width of the spring steel which will leave the slit when it is thus formed into its generally cylindrical configuration. Opposite end portions 40 may then be crimped or rolled inwardly. Spring D is also dimensioned so its central cylindrical portion 38 provides a tight press fit within cylindrical bore 46 in protector sleeve 36. Protector sleeve 36 is then pressed over spring means D to provide a firm unitary assembly. Links A are reversely positioned with their ends 12 and 14 interdigitated as shown in the drawing, and retaining device C is then positioned between facing surfaces 20 with the hole through spring means D aligned with holes 16 and 18. One end portion 24 of pin B is then forced through the aligned holes in one pair of the interdigitated ends 12 and 14.

Pin B has chamfered outer end portions as at 48 thereby forming circular ends 50 having a slightly smaller diameter than the diameter of inner spring edges 42. Therefore, one of inner edges 42 will bear against chamfered surface 48 and provide a cam action to expand the resilient fingers generally outwardly relative to axis 30 as pin B continues to be forced in by hammering. As pin B is driven through retaining device C, one of the end portions 40 will snap into one of grooves 26. As hammering on pin B continues, those fingers will again be cammed outwardly by sloping surface 28 until both of opposite end portions 40 are aligned with spaced grooves 26, so that these end portions 40 then snap into both grooves 26 and securely lock pin B in position. The length of the pin is such that it will not protrude from either side of the connected link assembly. Sloping surfaces 32 allow forcible disassembly of the pin when desired. However, the steeper angle of sloping surfaces 32 securely locks retaining device C on pin B against accidental dislodgement.

When protector sleeve 36 is press fitted onto spring D, the internal diameter of central cylindrical portion 38 is preferably a sliding or slight interference fit on central pin portion 22. The diameter of inner edges 42 on opposite end portions 40 is substantially smaller than the diameter of pin B and substantially the same as the diameter of grooves 26 at the intersection of sloping surfaces 28 and 32.

It will be appreciated that many other equivalent arrangements may be provided for spring means D. For example, central cylindrical portion 38 may be seamless while crimped-in end portions 40 are longitudinally slit at one or more circumferential location to provide resilient fingers allowing deformation outwardly and inwardly relative to the longitudinal axis of pin B and retaining device C without rupturing the material of spring means D. Spring means D may also comprise two or more arcuate spring members positioned in circumferentially-abutting relationship and press fitted within protector sleeve 36. Each arcuate spring member in this form would have individual resilient fingers at the opposite end portions thereof extending inwardly, and of a width less than the width of each individual arcuate portion, so that such resilient fingers would be circumferentially spaced from one another on the arcuate spring members.

Dislodgement of retaining device C requires outward deformation of both opposite end portions 40. This provides an extremely secure locking action against accidental displacement. Arranging spring means D as a press fit within protector sleeve 36 provides a unitary assembly of retaining device C so that individual parts do not have to be stored and individually positioned when a pair of links are assembled. The arcuate end portions 40 also increase the stiffness of the spring action so that a greater securing force is obtainable with lighter spring material.

As indicated, the length of retaining device C is such that it substantially spans the space between facing surfaces 20. This minimizes or substantially eliminates axial play of pin B and retaining device C relative to links A.

When spring D is longitudinally split from end to end, the press fit of sleeve 36 thereon is such to provide spacing the ends of the slit sufficiently to allow compression of the spring so that it is retained within sleeve 36 with resilient action. The spring is still dimensioned so that the interior diameter of central portion 38 is a sliding or slight inteference fit on central portion 22 of pin B when sleeve 36 is on the spring.

It is also possible to make one elongated groove in the central portion of pin B so that the opposite ends of such groove would have only sloping surfaces 32 defining opposite abutment surfaces for engagement with the ends of the opposite resilient fingers. There would then be a radial clearance between the surface of such a groove and the internal surface of central portion 38 of spring D.

Central portion 38 of spring D has an external diameter substantially greater than the diameter of holes 16 and 18 through ends 12 and 14 of links A. In one arrangement, spring D has sufficient thickness so that the flat ends of crimped-in end portions 40 also have an exterior diameter greater than the diameter of holes 16 and 18 so that such flat ends will abut facing surfaces 20 adjacent holes 18. It is also possible to have spring D of such thickness that the external diameter of the outer edges of the crimped-in end portions is less than the diameter of holes 18, while the external diameter of central portion 38 is substantially larger than the diameter of holes 18. This would permit end portions 40 to slightly enter holes 18 upon axial shifting of pin B to hold end portions 40 against outward deformation and prevent accidental dislodgement. However, such an arrangement would require a special tool, such as a flat spanner fork, and sufficient clearance between the opposite ends of retaining device C and facing surfaces 20, for receiving such tool to prevent entry of the end portions into holes 18 during assembly or intentional disassembly.

When the spring is assembled from two or more individual spring members each having a central portion lying on the periphery of a cylinder and inwardly extending opposite spring fingers, all of the central portions of the individual spring members taken together still define a generally cylindrical central portion for the spring and the spring fingers extend radially inwardly from such central portion. Therefore, when the spring means is identified as having a generally cylindrical body portion, it is intended to cover arrangements where such body portion is one-piece or is formed by a plurality of individual spring members having circumferentially-abutting arcuate central portions.

The simultaneous outward deformation of both resilient end portions 40 required in order to shift pin B axially relative to link ends 12 and 14, further minimizes the possibility that pin B will be accidentally dislodged. This is due to arranging the abutment surfaces on central portion 22 of pin B as sidewalls 28 and 32 of spaced-apart grooves 26, so that axial dislodgement of pin B requires outward deformation of one end portion 40 against an abutment surface 28 and substantially simultaneous outward deformation of the other end portion 40 against an abutment surface 32. Although previous link assemblies have used spaced-apart pairs of individual C-shaped springs in arrangements requiring simultaneous outward deformation of both springs to dislodge the pin, such previous assemblies did not have the advantageous arrangement of a protector sleeve completely covering and holding the springs in a unitary assembly.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A coupling link for joining chains or the like comprising two U-shape half links having interdigitated ends with aligned holes therethrough, a pin extending through said holes for hingedly joining the half links, said pin having two axially spaced grooves intermediate its ends, and a retaining means interposed between and being substantially axially coextensive with the interconnected link ends, said retaining means having a hollow body portion of greater outer diameter than the diameter of the holes through the link ends and having radially inwardly bent arcuate spring members at opposite ends of said body portion, said spring members being selectively resiliently received in said spaced grooves to hold said pin in a predetermined axial position.

2. The coupling link set forth in claim 1 further comprising a protective cylindrical sleeve press fit over the hollow body portion, said sleeve being of substantially the same length as the retaining means.

3. The coupling link set forth in claim 1 wherein the two grooves in the pin are of V-shape, with the inner diameter of the opposed spring members in assembled condition lying on one face of each of the spaced grooves and the ends of such spring members engaging the opposite face of each of the spaced grooves.

4. The coupling link set forth in claim 3 wherein the slope of the groove face being engaged by the end of the spring fingers is greater than the slope of the other groove face.

5. The coupling link set forth in claim 1 wherein the pin between the two grooves has a diameter substantially equal to the inner diameter of the hollow body portion of the retaining means.

6. The coupling link of claim 1 wherein the radially inwardly bent annular spring members are formed from a plurality of circumferentially spaced fingers.

* * * * *